H. J. DAVIES.

CLOCK-CASE.

No. 6,924. Reissued Feb. 15, 1876.

Witnesses
John Becker
Geo. W. Hoffman

Henry J. Davies
by his Attorneys
Brown & Allen

UNITED STATES PATENT OFFICE.

HENRY J. DAVIES, OF BROOKLYN, NEW YORK.

IMPROVEMENT IN CLOCK-CASES.

Specification forming part of Letters Patent No. 161,211, dated March 23, 1875; reissue No. 6,924, dated February 15, 1876; application filed January 31, 1876.

DIVISION B.

*To all whom it may concern:*

Be it known that I, HENRY J. DAVIES, of Brooklyn, in the county of Kings and State of New York, have invented a new and useful Improvement in Clocks; and I do hereby declare that the following is a full, clear, and exact description of the same, reference being had to the accompanying drawing, which forms part of this specification.

This invention relates to clock-dials having sunken centers.

The invention consists in the novel construction of such dials with paper faces, as hereinafter described.

Figure 1:
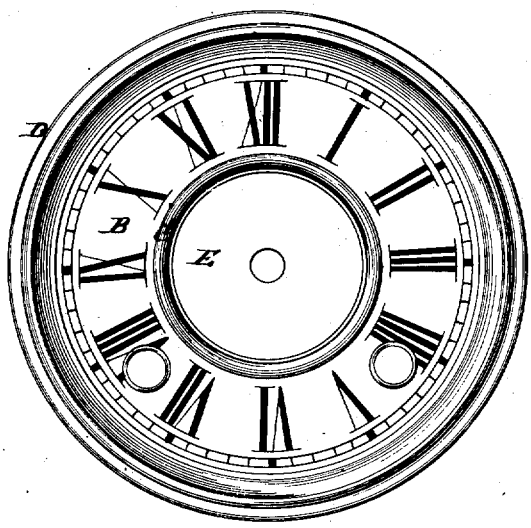
Figure 2:
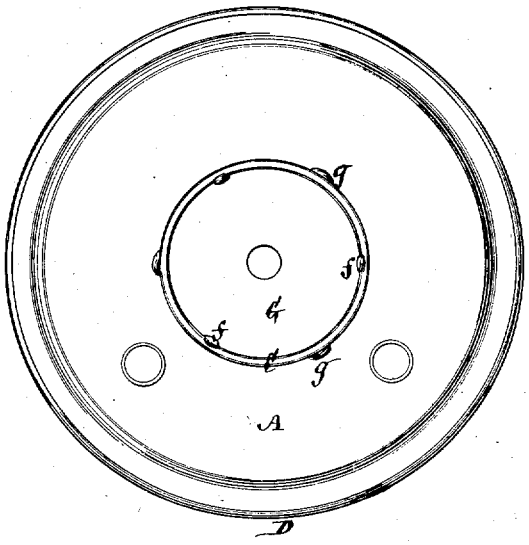
Figure 3:
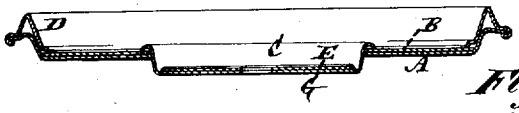
Figure 4:
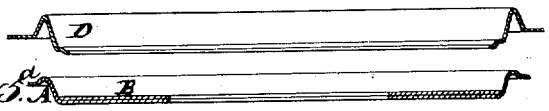
Figure 5:
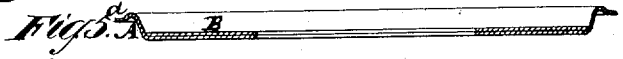
Figure 6:
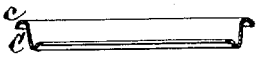
Figure 7:
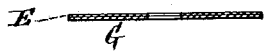

Figure 1 represents a front view of a clock-dial constructed according to my invention. Fig. 2 is a back view of the same; Fig. 3, a transverse section thereof; and Figs. 4, 5, 6, and 7, are sectional views of certain details which may be used in the construction of the dial.

A is an annular metal plate of cup shape, or having a raised outer flange, *a*. Pasted on or arranged within this annular plate is a paper dial facing, B, upon which are inscribed the hours and minutes, and which is also of an annular form, corresponding to, and of like size with, the inner sunken face of the annular metal plate A. A brass or other metal ring, C, having an exterior outer flange, *c*, is inserted from the front of the dial through the central opening of the metal plate A and its paper-dial facing B, the flange *c* of the ring C resting on the inner margin of the annular paper-dial facing B, and an outer annular hollow frame, D, resting on the outer margin of said facing, has its edge turned over, and thus secured to, the outer flange *a* of the metal plate A. Thus the annular paper-dial facing B is pinched or held to its place within the metal plate A on both its inner and outer edges. The ring C also serves to carry the sunken dial center E, which is likewise made of paper, and may be formed from the blank cut out of the center of a circular piece of paper, of which the annular facing B has been made, and afterward trimmed or recut slightly smaller. This sunken dial center E may be held to its place in the ring C, and the latter be secured to the metal plate A, by various means of fastening.

In the drawing, the sunken paper-dial center E is represented as pasted on or backed by a center metal plate, G, when required to give it increased stiffness, and said plate, shown as secured to the ring C by tacking it with solder, as at *f*, and the ring C similarly secured to the plate A by tacking it with solder, as at *g*. Such mode of attachment will serve as well as any other to explain that the sunken dial center, its inclosing-ring, and the annular plate receiving the latter, are united or locked with each other.

I claim—

1. The combination of the annular paper-dial facing B, with the annular metal plate A, the sunken paper-dial center E, and the ring C, substantially as specified.

2. The combination of the outer ring or frame D, the annular paper-dial facing B, the annular metal plate A, the sunken paper-dial center E, the center plate G, and the ring C, essentially as described.

HENRY J. DAVIES.

Witnesses:

BENJAMIN W. HOFFMAN,
FRED HAYNES.